United States Patent
Hu et al.

(10) Patent No.: US 10,122,617 B2
(45) Date of Patent: Nov. 6, 2018

(54) METHOD AND APPARATUS FOR IMPLEMENTING REDUNDANCY PROTECTION

(71) Applicant: ZTE CORPORATION, Shenzhen (CN)

(72) Inventors: Fang Hu, Shenzhen (CN); Xingfei Yin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 90 days.

(21) Appl. No.: 15/029,976

(22) PCT Filed: Jun. 20, 2014

(86) PCT No.: PCT/CN2014/080383
§ 371 (c)(1),
(2) Date: Apr. 15, 2016

(87) PCT Pub. No.: WO2015/055019
PCT Pub. Date: Apr. 23, 2015

(65) Prior Publication Data
US 2016/0308752 A1    Oct. 20, 2016

(30) Foreign Application Priority Data
Oct. 18, 2013    (CN) .......................... 2013 1 0493678

(51) Int. Cl.
*H04L 12/28*    (2006.01)
*H04L 12/707*    (2013.01)
(Continued)

(52) U.S. Cl.
CPC .......... *H04L 45/22* (2013.01); *H04L 43/0811* (2013.01); *H04L 43/10* (2013.01);
(Continued)

(58) Field of Classification Search
CPC ...................................................... H04L 45/22
See application file for complete search history.

(56) References Cited

U.S. PATENT DOCUMENTS

| 9,596,130 | B2 * | 3/2017 | Chen | .................... H04L 43/0811 |
| 2001/0037472 | A1 * | 11/2001 | Li | .......................... H04L 12/66 |
| | | | | 714/4.1 |

(Continued)

FOREIGN PATENT DOCUMENTS

| CN | 101009643 A | 8/2007 |
| CN | 101035009 A | 9/2007 |

(Continued)

OTHER PUBLICATIONS

International Search Report from PCT/CN2014/080383 ( 2 pgs).
(Continued)

*Primary Examiner* — Farah Faroul
(74) *Attorney, Agent, or Firm* — Calfee Halter & Griswold LLP

(57) ABSTRACT

A method for implementing redundancy protection applied in a first router includes: providing a first protection group comprising one active interface and any number of inactive interfaces selected from interfaces of the first router, wherein all interfaces in the first protection group serve to distribute or receive multicast traffic; activating Bidirectional Forwarding Detection BFD protocol only at the active interface in the first protection group, so as to enable the active interface in the first protection group to establish interaction with an active interface in a second protection, wherein a second router determines a status of the active interface in the first protection group through the active interface in the second protection group; and stopping all interfaces in the
(Continued)

first protection group to distribute or receive the multicast traffic when failure occurs at the active interface in the first protection group.

4 Claims, 3 Drawing Sheets

(51) Int. Cl.
    *H04L 12/775* (2013.01)
    *H04L 12/703* (2013.01)
    *H04L 12/26* (2006.01)
    *H04L 12/761* (2013.01)
    *H04L 12/939* (2013.01)

(52) U.S. Cl.
    CPC .............. *H04L 45/16* (2013.01); *H04L 45/28* (2013.01); *H04L 45/58* (2013.01); *H04L 49/557* (2013.01)

(56) References Cited

U.S. PATENT DOCUMENTS

| | | | |
|---|---|---|---|
| 2003/0101302 A1* | 5/2003 | Brocco | G06F 13/404 710/300 |
| 2003/0147344 A1 | 8/2003 | Stewart et al. | |
| 2006/0171303 A1* | 8/2006 | Kashyap | H04L 45/586 370/228 |
| 2007/0207591 A1* | 9/2007 | Rahman | H04L 45/00 438/439 |
| 2008/0259913 A1* | 10/2008 | Shah | H04L 12/185 370/386 |
| 2008/0267078 A1* | 10/2008 | Farinacci | H04L 12/1877 370/244 |
| 2009/0161670 A1 | 6/2009 | Shepherd et al. | |
| 2009/0245248 A1* | 10/2009 | Arberg | H04L 12/185 370/390 |
| 2009/0268607 A1 | 10/2009 | Wang et al. | |
| 2009/0274042 A1* | 11/2009 | Asati | H04L 12/185 370/225 |
| 2011/0038267 A1* | 2/2011 | Smith | H04L 43/0811 370/248 |
| 2012/0099422 A1* | 4/2012 | Liu | H04L 12/185 370/221 |
| 2012/0155463 A1* | 6/2012 | Vasseur | H04L 12/1863 370/390 |
| 2012/0281541 A1* | 11/2012 | Palmer | H04L 45/245 370/241 |
| 2013/0114402 A1* | 5/2013 | Ould-Brahim | H04L 43/0811 370/225 |
| 2014/0022890 A1* | 1/2014 | Dong | H04L 12/4641 370/219 |
| 2015/0124960 A1* | 5/2015 | Morrison | H04L 63/105 380/28 |
| 2015/0333952 A1* | 11/2015 | Chen | H04L 43/0811 370/242 |
| 2016/0112350 A1* | 4/2016 | Morrison | H04L 49/557 370/218 |
| 2016/0119229 A1* | 4/2016 | Zhou | H04L 12/4633 370/392 |
| 2016/0182253 A1* | 6/2016 | Wang | H04L 12/2859 370/256 |

FOREIGN PATENT DOCUMENTS

| | | |
|---|---|---|
| CN | 102025476 A | 4/2011 |
| CN | 102045185 A | 5/2011 |
| CN | 102111342 A | 6/2011 |

OTHER PUBLICATIONS

Extended Search Report from European Patent Application No. EP14854552.8, dated Feb. 17, 2016, 9 pages.

Office Action from Chinese Application No. 201310493678.3 dated Jul. 17, 2018.

\* cited by examiner

21 — A second protection group is provided by including one active interface and any number of inactive interfaces which are selected from interfaces of the second router and serve as backup interfaces for a first protection group; herein, all of interfaces in the first protection group are selected from interfaces of a first router and serve to distribute or receive multicast traffic, and the first protection group includes only one activate interface 22 — BFD protocol is activated only at the active interface in the second protection group, so as to enable the active interface in the second protection group to establish interaction with the active interface in the first protection, such that the second router can determine a status of the active interface in the first protection group through the active interface in the second protection group 23 — Interfaces in the second protection group are enabled to displace the all of interfaces in the first protection group for serving to distribute or receive the multicast traffic when failure of the active interface in the first protection group is detected by the second router through the active interface in the second protection group

Fig. 2

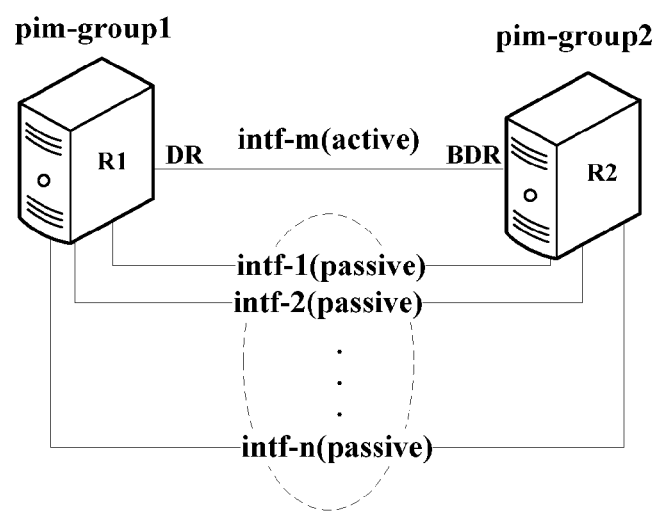

Fig. 3

METHOD AND APPARATUS FOR IMPLEMENTING REDUNDANCY PROTECTION

CROSS-REFERENCE TO RELATED APPLICATIONS

This application is a National Phase Application of International Application PCT/CN2014/080383, with an international filing date of Jun. 20, 2014, which is based on and claims priority to Chinese Patent Application No. 201310493678.3, filed on Oct. 18, 2013, the entire contents of which are incorporated herein by reference.

TECHNICAL FIELD

The present disclosure generally relates to fields of communication technology, and more particularly, to a method and an apparatus for implementing redundancy protection.

BACKGROUND

A campaign procedure of DR (Designated Router), as defined in "RFC4601" standard protocol, is implemented through a PIM Hello message. When a current DR fails, other PIM (Protocol-Independent Multicast) routers may be aware of the failure after timeout of a neighbourship so as to activate a convergence process of multicast routing. However, an interruption time of multicast data transmission due to the process is generally no less than a timeout value of the neighbourship, and thus may be on scale of seconds.

It should be note that, although a unique DR is elected out from any number of PIM interfaces with neighbourship therebetween, only the DRs provided at a source end (that is, so-called first hop node) and an IGMP (Internet Group Management Protocol) joining end (that is, so-called last hop node) would make protocol sense. Herein, the first hop node serves to receive multicast traffic and initiate a registration procedure, and the last hop node serves to process an IGMP joining request, generate (*, G) router and initiate a PIM joining procedure toward upstream.

Chinese patent application No. 200710073938.6 discloses deployment of VRRP (Virtual Router Redundancy Protocol) and BFD (Bidirectional Forwarding Detection) protocols between any related routers, such that convergence efficiency of DR can be improved by triggering a quick election of PIM neighbors through a rapid detection of link failure by means of BFD. Since it is unable to perform the deployment in advance, however, a lot of protocol messages may be introduced into local network, thereby causing a certain waste of network bandwidth. The waste of bandwidth becomes even more obvious especially for a telecommunication scenario of millisecond protection where a high-frequency transmission of detection messages is required.

Chinese patent application No. 201010252067.6 makes improvement based thereon, where a DR and a BDR (backup DR), serving as a backup for the DR, in a shared network segment are elected out by the PIM protocol using a Hello message. The DR takes functions such as distribution or reception of multicast traffic, and a BFD session is only established between the BDR and the DR to monitor survival status of the DR. Once a failure of the DR is detected, the BDR can be switched to a new DR and takes over functions thereof immediately. Since the BFD session is only deployed between DR/BDR, such a solution is more targeted with higher efficiency than that of Chinese patent application No. 200710073938.6.

According to the standard and patent applications described above, the protocol convergence procedure at the time of DR's failure is accelerated by detection of the BFD session between DR/BDR. BDF sessions need to be established between any DR/BDR, including all of interfaces between the DR/BDR, and a millisecond switchover protection can be realized when the sessions are few. As the number of DR/BDR pairs increases, however, the BFD sessions to be maintained increases accordingly. When there are hundreds of or even thousands of sessions, lots of messages may be generated if those sessions down due to a certain reason, such that the time required by switchover may reach second scale and thus protection requirement cannot be satisfied at a telecommunication level. A typical corresponding scenario may refer to an access of Layer-2 network via Layer-3 sub-interfaces of a router (i.e., a deployment of VLAN over the Layer-3 sub-interfaces), in which a common physical link is shared and a same father interface is possessed by those Layer-3 sub-interfaces. When a failure occurs in the physical link, related messages may be generated at all of the Layer-3 sub-interfaces.

SUMMARY

In view of above, the disclosure is directed to provide a method and an apparatus for implementing redundancy protection, so as to reduce BFD sessions efficiently.

There is provided a method for implementing redundancy protection according to an embodiment of the disclosure, which is applied in a first router and includes:

providing a first protection group including one active interface and any number of inactive interfaces selected from interfaces of the first router, wherein all of interfaces in the first protection group serve to distribute or receive multicast traffic;

activating bidirectional forwarding detection BFD protocol only at the active interface in the first protection group, so as to enable the active interface in the first protection group to establish interaction with an active interface in a second protection, such that a second router can determine a status of the active interface in the first protection group through the active interface in the second protection group; wherein all of interfaces in the second protection group are selected from interfaces of the second router and serve as backup interfaces for the first protection group, and the second protection group includes one active interface; and stopping the all of interfaces in the first protection group to distribute or receive the multicast traffic when failure occurs at the active interface in the first protection group.

In addition, there is also provided a method for implementing redundancy protection according to an embodiment of the disclosure, which is applied in a second router and includes:

providing a second protection group including one active interface and any number of inactive interfaces selected from interfaces of the second router and serving as backup interfaces for a first protection group, wherein all of interfaces in the first protection group are selected from interfaces of a first router and serve to distribute or receive multicast traffic, and the first protection group includes one activate interface;

activating bidirectional forwarding detection BFD protocol only at the active interface in the second protection group, so as to enable the active interface in the second protection group to establish interaction with the active interface in the first protection, such that the second router can determine a status of the active interface in the first protection group through the active interface in the second protection group; and enabling interfaces in the second protection group to displace the all of interfaces in the first protection group for serving to distribute or receive the multicast traffic when failure of the active interface in the first protection group is detected by the second router through the active interface in the second protection group.

Moreover, there is also provided an apparatus for implementing redundancy protection according to an embodiment of the disclosure, which is applied in a first router and includes:

a first selection module configured to provide a first protection group including one active interface and any number of inactive interfaces selected from interfaces of the first router, wherein all of interfaces in the first protection group serve to distribute or receive multicast traffic;

a first activation module configured to activate bidirectional forwarding detection BFD protocol only at the active interface in the first protection group, so as to enable the active interface in the first protection group to establish interaction with an active interface in a second protection, such that a second router can determine a status of the active interface in the first protection group through the active interface in the second protection group; and a first process module configured to stop the all of interfaces in the first protection group to distribute or receive the multicast traffic when failure occurs at the active interface in the first protection group.

Furthermore, there is also provided an apparatus for implementing redundancy protection according to an embodiment of the disclosure, which is applied in a second router and includes:

a second selection module configured to provide a second protection group including one active interface and any number of inactive interfaces selected from interfaces of the second router and serving as backup interfaces for a first protection group, wherein all of interfaces in the first protection group are selected from interfaces of a first router and serve to distribute or receive multicast traffic, and the first protection group includes one activate interface;

a second activation module configured to activate bidirectional forwarding detection BFD protocol only at the active interface in the second protection group, so as to enable the active interface in the second protection group to establish interaction with the active interface in the first protection, such that the second router can determine a status of the active interface in the first protection group through the active interface in the second protection group; and a second process module configured to enable interfaces in the second protection group to displace the all of interfaces in the first protection group for serving to distribute or receive the multicast traffic when failure of the active interface in the first protection group is detected by the second router through the active interface in the second protection group.

There is also provided an apparatus for implementing redundancy protection, applied in a first router, including:

a processor; and a memory configured to store instructions executable by the processor;

wherein, the processor is configured to perform:

providing a first protection group including one active interface and any number of inactive interfaces selected from interfaces of the first router, wherein all of interfaces in the first protection group serve to distribute or receive multicast traffic;

activating bidirectional forwarding detection BFD protocol only at the active interface in the first protection group, so as to enable the active interface in the first protection group to establish interaction with an active interface in a second protection, such that a second router can determine a status of the active interface in the first protection group through the active interface in the second protection group; wherein all of interfaces in the second protection group are selected from interfaces of the second router and serve as backup interfaces for the first protection group, and the second protection group includes one active interface; and stopping the all of interfaces in the first protection group to distribute or receive the multicast traffic when failure occurs at the active interface in the first protection group.

There is also provided an apparatus for implementing redundancy protection, applied in a second router, including:

a processor; and a memory configured to store instructions executable by the processor;

wherein, the processor is configured to perform:

providing a second protection group including one active interface and any number of inactive interfaces selected from interfaces of the second router and serving as backup interfaces for a first protection group, wherein all of interfaces in the first protection group are selected from interfaces of a first router and serve to distribute or receive multicast traffic, and the first protection group includes one activate interface;

activating bidirectional forwarding detection BFD protocol only at the active interface in the second protection group, so as to enable the active interface in the second protection group to establish interaction with the active interface in the first protection, such that the second router can determine a status of the active interface in the first protection group through the active interface in the second protection group; and enabling interfaces in the second protection group to displace the all of interfaces in the first protection group for serving to distribute or receive the multicast traffic when failure of the active interface in the first protection group is detected by the second router through the active interface in the second protection group.

There is also provided non-transitory computer-readable storage medium having stored therein instructions that, when executed by a processor of a first router, causes the first router to perform a method for implementing redundancy protection, the method including:

providing a first protection group including one active interface and any number of inactive interfaces selected from interfaces of the first router, wherein all of interfaces in the first protection group serve to distribute or receive multicast traffic;

activating bidirectional forwarding detection BFD protocol only at the active interface in the first protection group, so as to enable the active interface in the first protection group to establish interaction with an active interface in a second protection, such that a second router can determine a status of the active interface in the first protection group through the active interface in the second protection group; wherein all of interfaces in the second protection group are selected from interfaces of the second router and serve as backup interfaces for the first protection group, and the second protection group includes one active interface; and stopping the all of interfaces in the first protection group to distribute or receive the multicast traffic when failure occurs at the active interface in the first protection group.

There is also provided non-transitory computer-readable storage medium having stored therein instructions that, when executed by a processor of a second router, causes the second router to perform a method for implementing redundancy protection, the method including:

providing a second protection group including one active interface and any number of inactive interfaces selected from interfaces of the second router and serving as backup interfaces for a first protection group, wherein all of interfaces in the first protection group are selected from interfaces of a first router and serve to distribute or receive multicast traffic, and the first protection group includes one activate interface;

activating bidirectional forwarding detection BFD protocol only at the active interface in the second protection group, so as to enable the active interface in the second protection group to establish interaction with the active interface in the first protection, such that the second router can determine a status of the active interface in the first protection group through the active interface in the second protection group; and enabling interfaces in the second protection group to displace the all of interfaces in the first protection group for serving to distribute or receive the multicast traffic when failure of the active interface in the first protection group is detected by the second router through the active interface in the second protection group.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 2 is a flow chart illustrating a method for implementing redundancy protection applied in a second router according to an embodiment of the disclosure.

FIG. 3 is a schematic diagram illustrating application of the method for implementing redundancy protection at father and child interfaces according to an embodiment of the disclosure.

DETAILED DESCRIPTION

Technical problems to be solved, technical solution and advantageous effects of the present disclosure will become more apparent through following detailed description of embodiments with reference to drawings.

Figure 1:
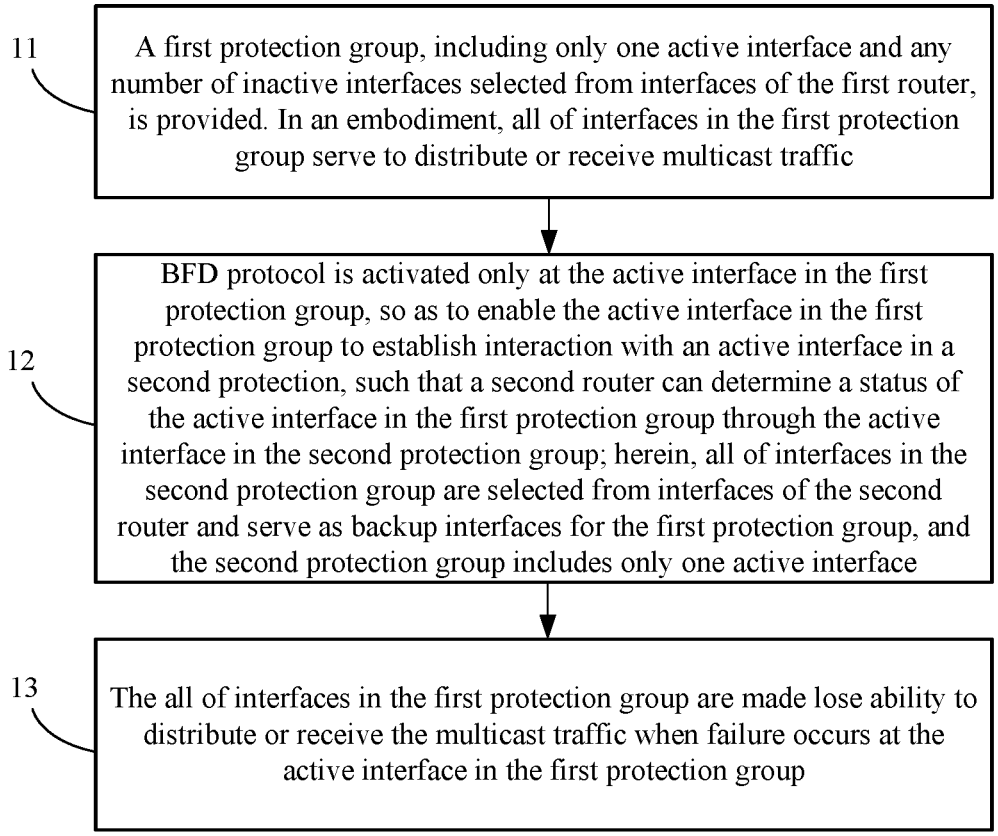
FIG. 1 is a flow chart illustrating a method for implementing redundancy protection applied in a first router according to an embodiment of the disclosure.

As shown in FIG. 1, a method for implementing redundancy protection applied in a first router includes following steps.

In step 11, a first protection group, including only one active interface and any number of inactive interfaces selected from interfaces of the first router, is provided. In an embodiment, all of interfaces in the first protection group serve to distribute or receive multicast traffic.

In step 12, BFD (Bidirectional Forwarding Detection) protocol is activated only at the active interface in the first protection group, so as to enable the active interface in the first protection group to establish interaction with an active interface in a second protection group, such that a second router can determine a status of the active interface in the first protection group through the active interface in the second protection group. In an embodiment, all of interfaces in the second protection group are selected from interfaces of the second router and serve as backup interfaces for the first protection group, and the second protection group includes only one active interface.

In step 13, the all of interfaces in the first protection group are made lose ability unable to distribute or receive the multicast traffic when failure occurs at the active interface in the first protection group.

In the embodiment, a BFD session is established between respective active interface of the first protection group and the second protection group, such that the second router can perform status detection of only the active interface in the first protection group. When failure occurs at the active interface in the first protection group, all of interfaces therein may lose their ability to distribute or receive the multicast traffic. In this way, the number of BFD sessions can be reduced efficiently according to the disclosure, and the interfaces in the second protection group can be enabled to displace the interfaces in the first protection group for serving to distribute or receive the multicast traffic, such that protection requirements can be satisfied at a level of telecommunication.

It should be noted that, distribution or reception of multicast traffic is typically performed by the DR (Designated Router), and a status of the active interface in the first protection group is "DR" in the embodiment, so all of interfaces in the first protection group are able to distribute or receive multicast traffic. In addition, multiple protection groups may be provided at the first router according to detailed implementation of the method in the disclosure, and interfaces in each of the protection groups may correspond to certain backup interfaces (for example, interfaces in the first protection group correspond to that in the second protection group).

Moreover, in order to accelerate change of forwarding status for all of interfaces in the first protections group (that is, loss of ability to distribute or receive multicast traffic as mentioned above), in an embodiment of step 13, the all of interfaces in the first protection group are made unable to distribute or receive the multicast traffic by: changing the forwarding status of the active interface in the first protection group to make the active interface stop distributing or receiving the multicast traffic, and enabling the inactive interfaces in the first protection group to inherit a changed forwarding status of the active interface.

In the embodiment, since the inactive interfaces in the first protection group are enabled to inherit the changed forwarding status of the active interface, forwarding control for all of interfaces in the first protection group can be achieved by generating a message related to change of forwarding status only aiming at the active interface in actual implementation.

In an embodiment according to the disclosure, the active interface in the first protection group is a father interface, and the inactive interfaces are child interfaces corresponding to the father interface.

Since forwarding status of the child interfaces depends on that of the father interface, in the first router, when failure occurs at a certain father interface, the failure is bound to occur at child interfaces corresponding to the father interface. Therefore, in the embodiment, a father interface is used as the active interface in the first protection group, and child interfaces corresponding thereto are used as the inactive interfaces in the first protection group, so as to implement a desirable redundancy protection.

Furthermore, as shown in FIG. 2, a method for implementing redundancy protection applied in a second router includes following steps.

In step 21, a second protection group is provided by including one active interface and any number of inactive interfaces which are selected from interfaces of the second router and serve as backup interfaces for a first protection group. In an embodiment, all of interfaces in the first protection group are selected from interfaces of a first router and serve to distribute or receive multicast traffic, and the first protection group includes only one activate interface.

In step 22, BFD protocol is activated only at the active interface in the second protection group, so as to enable the active interface in the second protection group to establish interaction with the active interface in the first protection, such that the second router can determine a status of the active interface in the first protection group through the active interface in the second protection group.

In step 23, interfaces in the second protection group are enabled to displace the all of interfaces in the first protection group for serving to distribute or receive the multicast traffic when failure of the active interface in the first protection group is detected by the second router through the active interface in the second protection group.

In the embodiment, a BFD session is established between respective active interface of the first protection group and the second protection group, such that the second router can perform status detection of only the active interface in the first protection group. When the second router determines that failure occurs at the active interface in the first protection group, interfaces in the second protection group may take the place of interfaces in the first protection group to distribute or receive the multicast traffic. In this way, the number of BFD sessions can be reduced efficiently according to the disclosure, and thus it can be relatively quick to implement substitution of the interfaces in the second protection group for the interfaces in the first protection group, such that protection requirements can be satisfied at a level of telecommunication.

In addition, corresponding to the detailed implementation of step 13 described above, in an embodiment of step 23, interfaces in the second protection group are enabled to displace the all of interfaces in the first protection group for serving to distribute or receive the multicast traffic by:

changing a forwarding status of the active interface in the second protection group to enable the active interface in the second protection group to displace the active interface in the first protection group for serving to distribute or receive the multicast traffic, and enabling the inactive interfaces in the second protection group to inherit a changed forwarding status of the active interface.

Further detailed description of the method for implementing redundancy protection according to the disclosure will be given as follows.

Embodiment I

Implementation of the present embodiment on Layer-3 father and child interfaces is as shown in FIG. 3. Both the first router R1 and the second router R2 are provided with interfaces (intf-1, . . . , intf-n) and intf-m. Herein, intf-m of R1 is a father interface, and (intf-1, . . . , intf-n) of R1 are child interfaces. A forwarding status of intf-m on R1 is configured as serving to receive or distribute multicast traffic. Accordingly, (intf-1, intf-n) of R1 also serve to receive or distribute multicast traffic.

In step S1, the first protection group pim-group 1 is provided on R1, where intf-m of R1 is used as the active interface in pim-group 1 and (intf-1, . . . , intf-n) of R1 are used as the inactive interfaces therein.

In an embodiment, the active interface intf-m of R1 is configured to establish multicast neighbourship and BFD session with the active interface intf-m of R2, such that R2 can determine a status of intf-m on R1 through intf-m interface on R2. The inactive interfaces of R1 and R2 are configured to inherit forwarding status of the active interfaces thereof, respectively, rather than establishing BFD session with each other.

In step S2, the second protection group pim-group 2 is provided on R2, where intf-m of R2 is configured to be the active interface, a direct connection is established between R1 and R2 via respective intf-m thereof and BFD protocol is activated. (intf-1, . . . , intf-n) of R2 in direct connection with (intf-1, . . . , intf-n) of R1 are used as the inactive interfaces.

In an embodiment, the interfaces in pim-group 2 are not configured to receive or distribute multicast traffic, and the inactive interfaces (intf-1, . . . , intf-n) of R1 belonging to pim-group 1 are not going to establish BFD session with the inactive interfaces (intf-1, . . . , intf-n) of R2 belonging to pim-group 2. For this purpose, it can be implemented by setting all of the inactive interfaces at PIM silent status or other manners, such that PIM neighbourship is not established between the inactive interfaces of R1 and that of R2 to avoid BFD session.

In step S3, when the active interface intf-m between pim-group 1 and pim-group 2 breaks down during interaction of BFD session, a change of forwarding status is initiated for the active interface in pim-group 1, such that the active interface intf-m in pim-group 1 may lose its ability to distribute or receive the multicast traffic and forwarding status of the inactive interfaces (intf-1, . . . , intf-n) therein may inherit that of the active interface intf-m. Furthermore, the active interface intf-m in pim-group 2 may take the place of the active interface intf-m in pim-group 1 for serving to distribute or receive the multicast traffic, and likewise, forwarding status of the inactive interfaces (intf-1, . . . , intf-n) in pim-group 2 may inherit that of the active interface intf-m corresponding thereto.

As can be seen from above, there are (n+1) interfaces, interfaces (intf-1, . . . , intf-n) and intf-m, required to be processed with status change, while only the active interface intf-m needs to be processed in a down event of BFD session according to the embodiment. In this way, the status can be changed more quickly, and the multicast becomes more reliable.

Embodiment II

Figure 4:
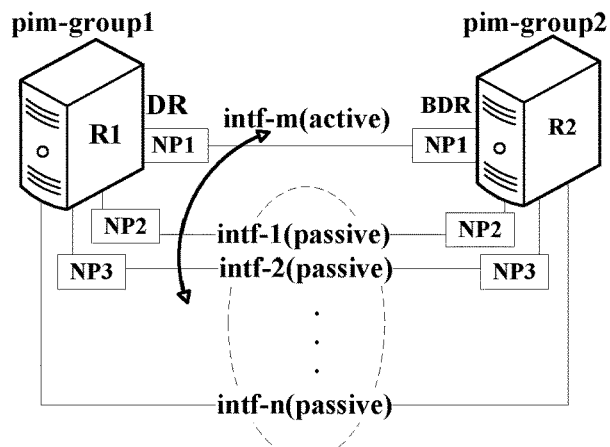
FIG. 4 is a schematic diagram illustrating application of the method for implementing redundancy protection at uncorrelated interfaces according to an embodiment of the disclosure.

The present disclosure can be also implemented on uncorrelated interfaces. As shown in FIG. 4, it is similar to the method described above except that, no dependence relation exists between the interfaces (intf-1, . . . , intf-n) and the interface intf-m in the first protection group which may be arranged on a single line card or distributed on different line cards. In other words, it is possible that breakdown of BFD session at the interface intf-m on a line card NP1 may result in changing forwarding status of related interfaces on remaining line cards NP2 and NP3.

In step S1', the first protection group pim-group 1 is provided on the first router R1.

In step S2', interfaces are configured for pim-group 1 on R1, where the interface intf-m on NP1 of R1 is used as the active interface and corresponding interfaces (intf-1, . . . , intf-n) on other line cards NP2 and NP3 are used as the inactive interfaces.

In step S3', the second protection group pim-group 2 is provided on R2, where the interface intf-m on NP1 of R2 is used as the active interface, a direct connection is established between R1 and R2 via respective intf-m thereof and BFD protocol is activated. The interfaces (intf-1, . . . , intf-n) on other line cards (NP2, NP3, . . . ) of R2 in direct connection with the interfaces (intf-1, . . . , intf-n) of R1 are used as the inactive interfaces in pim-group 2.

In step S4', multicast neighbourship and BFD session are established between the active interface intf-m of R1 belonging to pim-group 1 and the active interface intf-m of R2 belonging to pim-group 2.

In step S5', when the active interface intf-m between pim-group 1 and pim-group 2 breaks down during interaction of BFD session, a change of forwarding status is initiated for the active interface in pim-group 1, such that the active interface intf-m in pim-group 1 may lose its ability to distribute or receive the multicast traffic and forwarding status of the inactive interfaces (intf-1, . . . , intf-n) therein may inherit that of the active interface intf-m. Furthermore, the active interface intf-m in pim-group 2 may take the place of the active interface intf-m in pim-group 1 for serving to distribute or receive the multicast traffic, and likewise, forwarding status of the inactive interfaces (intf-1, . . . , intf-n) in pim-group 2 may inherit that of the active interface intf-m corresponding thereto.

As can be seen from above, the interfaces in the first protection group used in the method according to the disclosure are not limited to father and child interfaces, but all of PIM interfaces at a same level of protection can be protected altogether through a single protection group.

Figure 5:
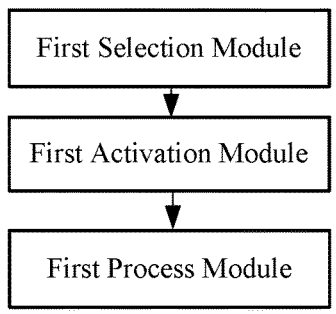
FIG. 5 is a block diagram illustrating an apparatus for implementing redundancy protection applied in a first router according to an embodiment of the disclosure.

In addition, as shown in FIG. 5, there is also provided an apparatus for implementing redundancy protection according to an embodiment of the disclosure, which is applied in a first router and includes:

a first selection module configured to provide a first protection group including only one active interface and any number of inactive interfaces selected from interfaces of the first router; herein, all of interfaces in the first protection group serve to distribute or receive multicast traffic;

a first activation module configured to activate BFD protocol only at the active interface in the first protection group, so as to enable the active interface in the first protection group to establish interaction with an active interface in a second protection, such that a second router can determine a status of the active interface in the first protection group through the active interface in the second protection group; and a first process module configured to stop the all of interfaces in the first protection group to distribute or receive the multicast traffic when failure occurs at the active interface in the first protection group.

In the embodiment, a BFD session is established between respective active interface of the first protection group and the second protection group, such that the second router can perform status detection of only the active interface in the first protection group. When failure occurs at the active interface in the first protection group, all of interfaces therein may lose their ability to distribute or receive the multicast traffic. In this way, the number of BFD sessions can be reduced efficiently according to the disclosure, and thus it can be relatively quick to implement substitution of the interfaces in the second protection group for the interfaces in the first protection group, such that protection requirements can be satisfied at a level of telecommunication.

Moreover, in an embodiment of the disclosure, the first process module may be further configured to change a forwarding status of the active interface in the first protection group to stop the active interface to distribute or receive the multicast traffic, and enable the inactive interfaces in the first protection group to inherit a changed forwarding status of the active interface.

Moreover, in an embodiment of the disclosure, the active interface in the first protection group may be a father interface, and the inactive interfaces may be child interfaces corresponding to the father interface.

As can be seen from above, the apparatus in this embodiment corresponds to the method for implementing redundancy protection applied in the first router according to the disclosure, and thus can achieve same technical effects as the method.

Figure 6:
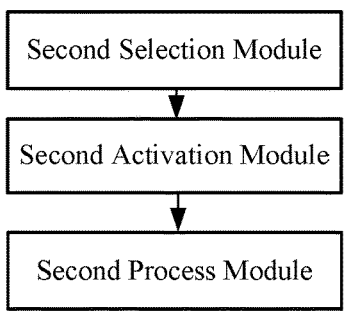
FIG. 6 is a block diagram illustrating an apparatus for implementing redundancy protection applied in a second router according to an embodiment of the disclosure.

In addition, as shown in FIG. 6, an apparatus for implementing redundancy protection applied in a second router includes:

a second selection module configured to provide a second protection group including only one active interface and any number of inactive interfaces selected from interfaces of the second router and serving as backup interfaces for a first protection group; herein, all of interfaces in the first protection group are selected from interfaces of a first router and serve to distribute or receive multicast traffic, and the first protection group includes only one activate interface;

a second activation module configured to activate BFD protocol only at the active interface in the second protection group, so as to enable the active interface in the second protection group to establish interaction with the active interface in the first protection, such that the second router can determine a status of the active interface in the first protection group through the active interface in the second protection group; and a second process module configured to enable interfaces in the second protection group to displace the all of interfaces in the first protection group for serving to distribute or receive the multicast traffic when failure of the active interface in the first protection group is detected by the second router through the active interface in the second protection group.

In the embodiment, a BFD session is established between respective active interface of the first protection group and the second protection group, such that the second router can perform status detection of only the active interface in the first protection group. When the second router determines that failure occurs at the active interface in the first protection group, interfaces in the second protection group may take the place of interfaces in the first protection group to distribute or receive the multicast traffic. In this way, the number of BFD sessions can be reduced efficiently according to the disclosure, and thus it can be relatively quick to implement substitution of the interfaces in the second protection group for the interfaces in the first protection group, such that protection requirements can be satisfied at a level of telecommunication.

Moreover, in an embodiment of the disclosure, the second process module is configured to:

change a forwarding status of the active interface in the second protection group to enable the active interface in the second protection group to displace the active interface in the first protection group for serving to distribute or receive the multicast traffic, and enable the inactive interfaces in the second protection group to inherit a changed forwarding status of the active interface.

As can be seen from above, the apparatus in this embodiment corresponds to the method for implementing redundancy protection applied in the second router according to the disclosure, and thus can achieve same technical effects as the method.

The disclosure has been described by reference to the embodiments above which are merely examples for implementing the disclosure. It should be noted that the present disclosure is not limited to the exact embodiments that have been described above.

We claim:

1. A method for implementing redundancy protection, applied in a first router, comprising:
   providing a first protection group comprising one father interface and any number of child interfaces selected from interfaces of the first router, wherein all interfaces in the first protection group serve to distribute or receive multicast traffic;
   activating Bidirectional Forwarding Detection (BFD) protocol only at the father interface in the first protection group, enabling the father interface in the first protection group to establish interaction with a father interface in a second protection group, wherein a second router determines a status of the father interface in the first protection group through the father interface in the second protection group; wherein all interfaces in the second protection group are selected from interfaces of the second router and serve as backup interfaces for the first protection group, and the second protection group comprises one father interface; and
   changing a forwarding status of the father interface in the first protection group to stop the father interface to distribute or receive the multicast traffic, and enabling the child interfaces in the first protection group to inherit a changed forwarding status of the father interface.

2. A method for implementing redundancy protection, applied in a second router, comprising:
   providing a second protection group comprising one father interface and any number of child interfaces selected from interfaces of the second router and serving as backup interfaces for a first protection group, wherein all interfaces in the first protection group are selected from interfaces of a first router and serve to distribute or receive multicast traffic, and the first protection group comprises one activate interface;
   activating Bidirectional Forwarding Detection (BFD) protocol only at the father interface in the second protection group, enabling the father interface in the second protection group to establish interaction with the father interface in the first protection, wherein the second router determines a status of the father interface in the first protection group through the father interface in the second protection group; and
   changing a forwarding status of the father interface in the second protection group to enable the father interface in the second protection group to displace the father interface in the first protection group for serving to distribute or receive the multicast traffic, and enabling the child interfaces in the second protection group to inherit a changed forwarding status of the father interface.

3. An apparatus for implementing redundancy protection, applied in a first router, comprising:
   a processor; and
   a memory configured to store instructions executable by the processor;
   wherein, the processor is configured to perform:
   providing a first protection group comprising one father interface and any number of child interfaces selected from interfaces of the first router, wherein all interfaces in the first protection group serve to distribute or receive multicast traffic;
   activating Bidirectional Forwarding Detection (BFD) protocol only at the father interface in the first protection group, enabling the father interface in the first protection group to establish interaction with a father interface in a second protection group, wherein a second router determines a status of the father interface in the first protection group through the father interface in the second protection group; wherein all interfaces in the second protection group are selected from interfaces of the second router and serve as backup interfaces for the first protection group, and the second protection group comprises one father interface; and
   changing a forwarding status of the father interface in the first protection group to stop the father interface to distribute or receive the multicast traffic, and enabling the child interfaces in the first protection group to inherit a changed forwarding status of the father interface.

4. An apparatus for implementing redundancy protection, applied in a second router, comprising:
   a processor; and
   a memory configured to store instructions executable by the processor;
   wherein, the processor is configured to perform:
   providing a second protection group comprising one father interface and any number of child interfaces selected from interfaces of the second router and serving as backup interfaces for a first protection group, wherein all interfaces in the first protection group are selected from interfaces of a first router and serve to distribute or receive multicast traffic, and the first protection group comprises one activate interface;
   activating Bidirectional Forwarding Detection (BFD) protocol only at the father interface in the second protection group, enabling the father interface in the second protection group to establish interaction with the father interface in the first protection, wherein the second router determines a status of the father interface in the first protection group through the father interface in the second protection group; and
   changing a forwarding status of the father interface in the second protection group to enable the father interface in the second protection group to displace the father interface in the first protection group for serving to distribute or receive the multicast traffic, and enabling the child interfaces in the second protection group to inherit a changed forwarding status of the father interface.

\* \* \* \* \*